United States Patent
Kreiser et al.

(10) Patent No.: US 6,910,585 B1
(45) Date of Patent: Jun. 28, 2005

(54) DYNAMIC CENTRIFUGAL GAS CLASSIFIER AND METHOD OF CLASSIFYING PERFORMED THEREWITH

(75) Inventors: Clarence Richard Kreiser, Richland, PA (US); James Frank Miller, Lebanon, PA (US)

(73) Assignee: Fisher-Klosterman, Inc., Louisville, KY (US)

( * ) Notice: Subject to any disclaimer, the term of this patent is extended or adjusted under 35 U.S.C. 154(b) by 0 days.

(21) Appl. No.: 09/653,011

(22) Filed: Aug. 31, 2000

(51) Int. Cl.[7] .................................................. B04C 3/00
(52) U.S. Cl. .................... 209/139.2; 209/148; 209/710; 209/713; 209/722
(58) Field of Search ................................ 209/133, 138, 209/139.2, 142, 143, 146, 147, 148, 713, 722, 710

(56) References Cited

U.S. PATENT DOCUMENTS

| | | | |
|---|---|---|---|
| 3,240,335 A | | 3/1966 | Vandenheock ............... 209/136 |
| 3,397,780 A | | 8/1968 | Beuzeval ..................... 209/137 |
| 4,574,045 A | * | 3/1986 | Crossmore, Jr. ......... 209/722 X |
| 4,784,756 A | * | 11/1988 | Ovaskainen ............ 209/713 X |
| 5,269,637 A | * | 12/1993 | Gomes, Jr. .............. 209/722 X |

FOREIGN PATENT DOCUMENTS

| DE | 287662 | * | 3/1991 | ................. 209/722 |
|---|---|---|---|---|

* cited by examiner

Primary Examiner—Tuan N. Nguyen
(74) Attorney, Agent, or Firm—Gary M. Hartman; Domenica N.S. Hartman

(57) ABSTRACT

An apparatus and process for classifying fine particles from a particulate material, such as toner and pigment powders. The apparatus is generally a dynamic centrifugal gas (air) classifier that combines the operational advantages of centrifugal air classifiers with increased aerodynamic forces provided by a rotating member to classify powders at cutpoints of fifteen micrometers and finer. The classifier is configured to have an annular-shaped inner passage, an annular-shaped outer passage circumscribing the inner passage, and an inlet through which a gas-entrained particulate material is introduced substantially tangentially into the inner passage so as to impart a centrifugal force to the particulate material. A portion of the entraining gas is preferably separated and directed into the outer passage. Within a separation section of the classifier, the gas flowing through the outer passage is passed through the particulate material within the inner passage to separate finer and coarser fractions of the particulate material. The finer fraction is then returned to the inner passage, while a vertical outlet receives the coarser fraction from the separation section. The finer fraction continues through the inner passage to a horizontal outlet disposed at the horizontal axis of the inner passage. A horizontal rotating member is disposed within the horizontal outlet and applies additional centrifugal force to the material within the inner passage, thereby preventing an intermediate fraction of the material from entering the horizontal outlet.

22 Claims, 1 Drawing Sheet

DYNAMIC CENTRIFUGAL GAS CLASSIFIER AND METHOD OF CLASSIFYING PERFORMED THEREWITH

BACKGROUND OF THE INVENTION

1. Field of the Invention

This invention generally relates to classifiers used for separating fine particles from a particulate material. More particularly, this invention is directed to a centrifugal gas classifier equipped with a rotating member that improves particle separation and finer cutpoints, such as particle sizes below fifteen micrometers.

2. Description of the Prior Art

Classification is a process for separating particles below a targeted diameter, referred to as the cutpoint, from a powder or other particulate material. Various types of gas (air) classifiers are known for classifying particulate materials, such as construction materials and fine powders used in toners of copiers and printers. Classifiers can be categorized as either dynamic classifiers with rotating parts such as discs, fans and turbines, or static classifiers without moving parts. The latter includes gravitational, gravitational-inertial and centrifugal classifiers, examples of which include U.S. Pat. Nos. 3,240,335 and 3,397,780. Static classifiers provide the advantages of high efficiencies with lower power requirements and lower operating costs as compared to dynamic classifiers.

The type of static classifier used is typically dependent in part on the capacity, feed rate, and cutpoint control required for the particular operation. For example, gravitational classifiers are suitable for cutpoints on the order of about ten to one hundred mesh (about 1650 to about 150 micrometers), while gravitational-inertial classifiers utilize increased air velocities to achieve lower cutpoints, e.g., about fifty to two hundred mesh (about 300 to about 75 micrometers). Cutpoints as low as about fifteen micrometers can typically be achieved with centrifugal classifiers, which employ an air stream flowing in a circular path. Internal baffles apply a drag force to coarser particles of the particulate material, while the circulating air is directed through the material to separate the finer particles. Particles above the cutpoint eventually drop to the bottom of the classifier where they are discharged, while the finer particles continue on a spiraling path toward a central outlet.

While cutpoints above fifteen micrometers are appropriate for many applications, powder materials for certain applications, including copier and printer toners and pigments for various uses, must often be finer. For this reason, dynamic classifiers are often used in these applications. Because conventional dynamic classifiers have significantly higher power requirements and operating costs than static classifiers, it would be desirable if a lower cost alternative was available to serve the toner and pigment markets, as well as other industries that require particulate materials with particle sizes of less than fifteen micrometers.

SUMMARY OF THE INVENTION

The present invention provides an apparatus and process for classifying fine particles from a particulate material, such as toner and pigment powders. The apparatus is generally a dynamic centrifugal gas (air) classifier that combines the operational advantages of centrifugal air classifiers with increased aerodynamic forces provided by a rotating member to classify powders at fifteen micrometers and finer.

According to this invention, the classifier is configured to have an annular-shaped inner passage having a horizontal axis, an annular-shaped outer passage circumscribing the inner passage, and an inlet through which a gas-entrained particulate material is introduced substantially tangentially into the inner passage so as to impart a centrifugal force to the particulate material. In a preferred embodiment, a portion of the gas (e.g., air) is separated and directed into the outer passage at the inlet. Within a separation section of the classifier, the gas flowing through the outer passage is passed through the particulate material within the inner passage to separate finer and coarser fractions of the particulate material. The finer fraction is then returned to the inner passage, while a vertical outlet receives the coarser fraction from the separation section. The finer fraction continues through the inner passage to a horizontal outlet disposed at the horizontal axis of the inner passage and surrounded by the inner passage. Disposed within the horizontal outlet is a horizontal rotating member that applies additional centrifugal force to the finer fraction within the inner passage, thereby preventing an intermediate fraction of the particulate material from entering the horizontal outlet.

According to the above, the rotating member at the horizontal outlet is able to significantly reduce the cutpoint otherwise achievable with the centrifugal configuration of the classifier. The additional centrifugal forces applied to the remaining particles at the horizontal outlet create a sharp separation at finer cutpoints, e.g., below fifteen micrometers, while still retaining many of the operational advantages of the centrifugal configuration. As a result, the dynamic centrifugal gas classifier of this invention offers a lower cost alternative to the dynamic classifiers conventionally used by the toner and pigment markets.

Other objects and advantages of this invention will be better appreciated from the following detailed description.

BRIEF DESCRIPTION OF THE DRAWINGS

The present invention will now be described, by way of example, with reference to the accompanying drawings, in which.

DETAILED DESCRIPTION OF THE INVENTION

Figure 1:
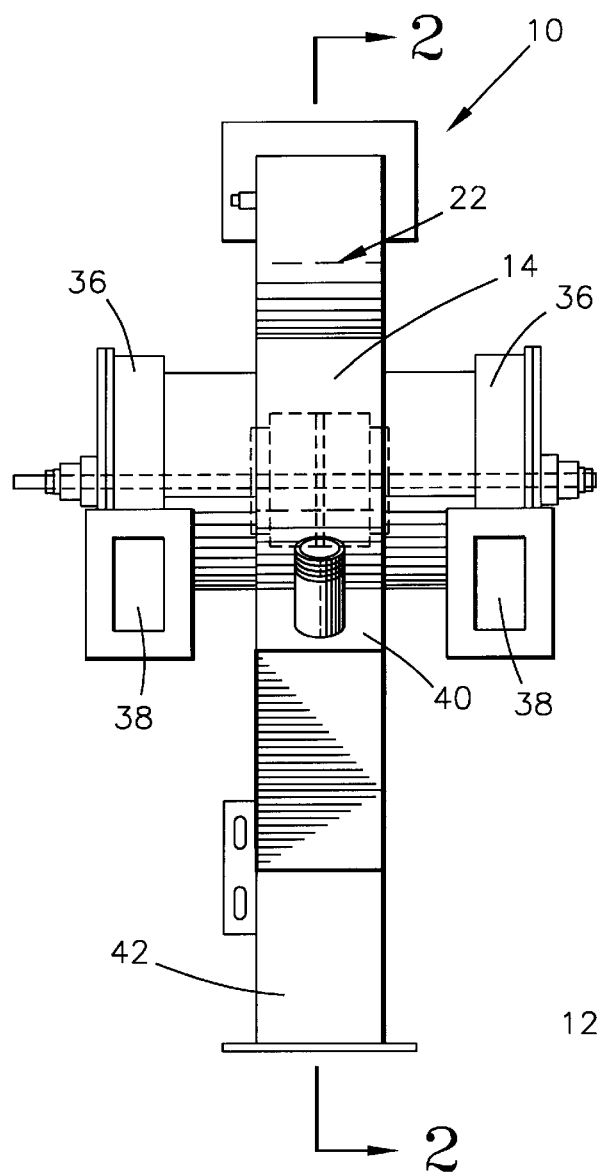
FIGS. 1 and 2 are front and cross-sectional views, respectively, of a dynamic centrifugal gas classifier in accordance with a preferred embodiment of this invention.
Figure 2:
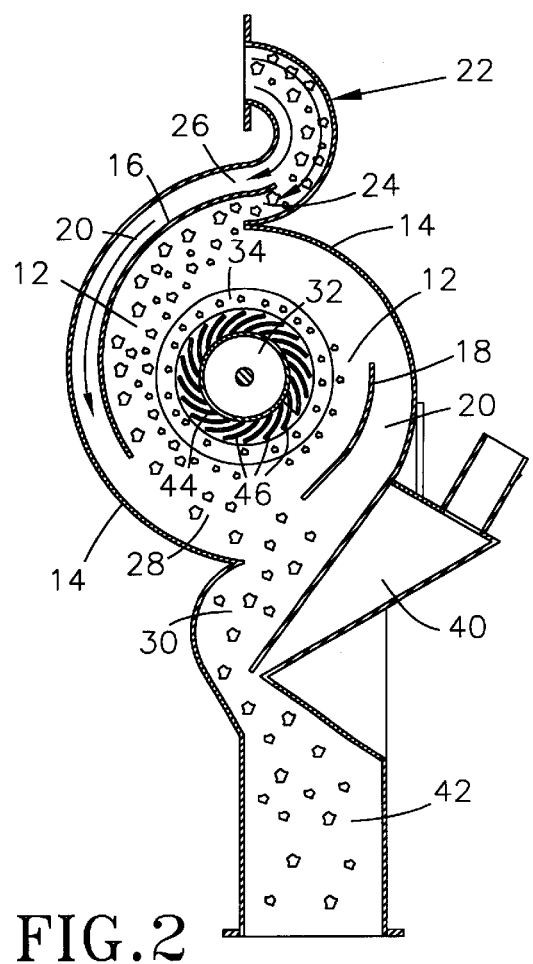

A dynamic centrifugal gas (air) classifier 10 in accordance with a preferred embodiment of this invention is shown in FIGS. 1 and 2. The classifier 10 is configured to remove fine particles from a quantity of gas-entrained particulate feed material. Most typically, the gas is air, and the following discussion will make reference to the use of air as the carrier gas, though with the understanding that other carrier gases could be used.

As seen in FIG. 2, the air-entrained feed material flows generally within a circular path defined by an annular-shaped inner passage 12 within an enclosure 14. During its operation, the classifier 10 is upright so that the inner passage 12 has a generally horizontal axis. The outer perimeter of the inner passage 12 is defined by two or more baffles 16 and 18, which separate the inner passage 12 from an annular-shaped outer passage 20 within the enclosure 14. An inlet 22 to the classifier 10 is located at the top of the enclosure 14, so that air-entrained feed material entering the enclosure 14 flows generally in a downward direction. In a preferred embodiment, the inlet 22 is arcuate and the baffle 16 extends into the inlet 22 to define two inlet passages 24 and 26. As seen in FIG. 2, the bend in the inlet 22 is sufficiently sharp to cause a reversal in the flow direction of the air-entrained feed material, such that the feed material is separated from the air stream by centrifugal action. The feed material (still partially entrained by air) enters the inner passage 12 through the inlet passage 24, while a substantially particle-free air stream passes through the inlet 26 behind the baffle 16 before entering the outer passage 20. The baffle 16 serves as a retainer against which the feed material slides as it is forced to take the circular path of the inner passage 12.

The baffles 16 and 18 are separated by an opening 28 near the lower end of the enclosure 14, where the air stream within the outer passage 20 crosses a curtain of feed material ejected from the inner passage 12 as a result of centrifugal forces. The passage of this air stream through the feed material produces an intense scrubbing action, which breaks up any agglomerates and subjects all particles of the feed material to an equal drag force, thereby separating the finer particles from the feed material. Gravitational force immediately precipitates any very large particles to the bottom of the enclosure 14, where they enter an outlet passage 30 below the opening 28 between the baffles 16 and 18. The remaining particles, i.e., intermediate and finer particles of the feed material, are carried by the air stream into either the inner or outer passage 12 or 20 separated by the baffle 18. Downstream of the baffle 18, each remaining particle is subjected to centrifugal force proportional to the cube of its diameter, causing the particle to move toward the periphery of the inner passage 12. Concurrently, the air stream exerts a drag force directly proportional to the diameter of the particle. Under design conditions, the centrifugal force equals the drag force of particles whose diameters are at the desired cutpoint. Therefore, the opposing drag and centrifugal forces are at equilibrium only at the cutpoint, such that particles above and below the cutpoint become separated. Those larger than the cutpoint (intermediate particles) are dominated by the centrifugal force, and are therefore forced toward the outer perimeter of the inner passage 12 where their velocity is reduced, allowing gravitational forces to draw them toward the outlet passage 30. In contrast, those particles below the cutpoint (finer particles) are dominated by the drag force, and are therefore entrained within the air stream spiraling toward the center 32 of the enclosure 14, where two exhaust orifices 34 (one of which is visible in FIG. 2) are located at opposite axial ends of the generally circular enclosure 14. The orifices 34 open into two chambers 36 (FIG. 1) having outlets 38 through which the finer particles are removed. In practice, the classifier 10 of this invention may be used in combination with a cyclone and fabric filters (not shown) located downstream of the outlets 38 to further process the finer particles, including the removal of dust particles.

Following separation at the opening 28 between the baffles 16 and 18, any relatively coarser and intermediate particles remaining in the feed material returned to the inner passage 12 are subject to centrifugal force which forces the coarser particles outward away from the center 32 of the enclosure 14, eventually encountering the baffle 16. As a result, these coarser and intermediate particles merge within the feed material entering the inner passage 12 through the inlet passage 24, and are subsequently resubjected to the scrubbing action at the lower end of the enclosure 14. Eventually, these coarser and intermediate particles will settle out of the enclosure 14 and pass through the outlet passage 30. The air stream flow path within the classifier 10 that maintains the above operation is controlled by the size of the exhaust orifices 34 relative to the volume of the enclosure 14, and can be adjusted or modified by the introduction of secondary air to the outlet passage 30. The secondary air is shown as being introduced through a lower inlet 40 and entrains any fine particles within the outlet passage 30, which are then returned to the outer passage 20. The coarser and intermediate particles continue through the outlet passage 30, and eventually exit through a lower discharge 42.

Those skilled in the art will appreciate that, to obtain sharp separation, forces acting on those particles at the cutpoint must be in equilibrium throughout the inner passage 12 to ensure that every introduced particle is subjected to the same separation influence. The configuration of the classifier 10 shown in FIG. 2 forms a controlled vortex with a substantially constant velocity profile to achieve equilibrium at the cutpoint. The cutpoint is controlled by the vortex flow path steepness, the resulting tangential velocity of the particles, and the absolute dimensions within the enclosure 14, all of which can be appropriately adjusted by those skilled in the art to achieve the desired operation for the classifier 10.

While the operation of the classifier 10 as described above is capable of achieving low cutpoints, generally on the order of about fifteen micrometers, still lower cutpoints are desired for certain applications, including the above-noted toner and pigment materials. To further reduce the cutpoint, the classifier 10 of this invention includes a rotating member at the center of the enclosure 14 and surrounded by the inner passage 12. This member is shown in FIG. 2 as a horizontal rotating wheel 44 with its axis of rotation coinciding with the axis of the inner passage 12.

The wheel 44 is equipped with vanes 46 that extend at an angle to the radial direction of the wheel 44. As depicted in FIG. 2, the wheel 44 and its vanes 46 are sized so that the diameter of their outer periphery is smaller than the orifices 34, allowing for the horizontal flow of fine particles from the inner passage 12 through the orifices 34 and into the chambers 36. According to the invention, the wheel 44 and its vanes 46 serve to apply additional centrifugal forces to the particles circulating within the inner passage 12, creating a sharp separation at cutpoints that are finer than otherwise possible through conventional means, e.g., sizing of the orifices 34 to the volume of the enclosure 14 and the introduction of secondary air through the inlet 40. More particularly, cutpoints of less than fifteen micrometers can be achieved, with cutpoints of as low as five to ten micrometers believed possible. Consequently, the classifier 10 is suitable for classifying tone and pigment powders for use in copiers, printers and the like.

The wheel 44 and its construction can be readily configured and sized to produce a suitable counterflow to the inward spiraling flow within the inner passage 12, which prevents intermediate particles from entering the orifices 34 that were not sufficiently coarse to immediately drop out of the enclosure 14 through the opening 28 or otherwise be returned to the opening 28 as a result of the aerodynamics within the inner passage 12. Through experimentation, the size and shape of the vanes 46 and the rotational velocity of the wheel 44 can also be optimized to produce the desired effect, particularly with respect to the low cutpoints that can be achieved with the classifier 10.

While the invention has been described in terms of a preferred embodiment, it is apparent that other forms could be adopted by one skilled in the art. For example, the features of this invention could be incorporated within classifier systems that differ from that represented in the Figures, and other and/or additional equipment could be employed to further process the feed material after it leaves the classifier 10. Furthermore, the function of the wheel 44 and its vanes 46 could be achieved by other structures capable of inhibiting intermediate particles from entering the orifices 34. Accordingly, the scope of the invention is to be limited only by the following claims.

What is claimed is:

1. A dynamic centrifugal gas classifier comprising:
   an annular-shaped inner passage having a horizontal axis;
   an annular-shaped outer passage circumscribing at least a portion of the inner passage;
   first inlet means for introducing a gas-entrained particulate material substantially tangentially into the inner passage so as to impart a centrifugal force to the particulate material;
   second inlet means for introducing a gas into the outer passage;
   means for separating finer and coarser fractions of the particulate material by passing the gas flowing in the outer passage through at least a portion of the particulate material;
   means for returning the finer fraction to the inner passage;
   vertical outlet means for receiving the coarser fraction from the separating means and removing the coarser fraction from the dynamic centrifugal gas classifier;
   horizontal outlet means for removing the finer fraction from the inner passage, the horizontal outlet means being disposed at the horizontal axis of the inner passage and surrounded by the inner passage; and
   rotating means having a horizontal axis of rotation and disposed in the horizontal outlet means for applying additional centrifugal force to the finer fraction to prevent an intermediate fraction of the particulate material from entering the horizontal outlet means.

2. A dynamic centrifugal gas classifier according to claim 1, further comprising means for introducing a gas into the vertical outlet means to prevent the finer fraction from passing through the vertical outlet means while allowing the coarser fraction to continue through the vertical outlet means.

3. A dynamic centrifugal gas classifier according to claim 1, wherein portions of the inner and outer passages are separated by baffle plates.

4. A dynamic centrifugal gas classifier according to claim 1, wherein the first and second inlet means are defined by a single inlet passage and a baffle dividing a portion of the inlet passage to define a first inlet into the inner passage for the particulate material and a second inlet into the outer passage for the gas.

5. A dynamic centrifugal gas classifier according to claim 4, wherein the inlet passage is arcuate.

6. A dynamic centrifugal gas classifier according to claim 5, wherein the inlet passage is configured so that the particulate material flows through a portion of the inlet passage in a first direction and enters the inner passage while flowing in a second direction that is substantially opposite the first direction.

7. A dynamic centrifugal gas classifier according to claim 1, wherein the vertical outlet means has an upper end in communication with the inner and outer passages.

8. A dynamic centrifugal gas classifier according to claim 1, wherein the horizontal outlet means comprises an axial passage circumscribed by the inner passage, a pair of orifices at opposite axial ends of the axial passage, and a pair of oppositely-disposed horizontal passages oriented substantially parallel to the horizontal axis of the inner passage.

9. A dynamic centrifugal gas classifier according to claim 8, wherein the rotating means comprises a wheel disposed within the axial passage and a plurality of vanes at a periphery of the wheel, the horizontal axis of rotation of the rotating means coinciding with the horizontal axis of the inner passage, the wheel and the vanes being configured to propel the intermediate fraction away from the horizontal outlet means.

10. A dynamic centrifugal gas classifier according to claim 1, wherein the rotating means comprises a wheel with a plurality of vanes at a periphery thereof and the horizontal axis of rotation of the rotating means is parallel to the horizontal axis of the inner passage, the wheel and vanes being configured to propel the intermediate fraction away from the horizontal outlet means.

11. A dynamic centrifugal gas classifier according to claim 1, wherein the separating means passes the gas through a portion of the particulate material that has been ejected by the centrifugal force from the inner passage toward the outer passage, and the means for returning the finer fraction to the inner passage uses the gas that has flowed through the portion of the particulate material to carry the finer fraction toward the inner passage.

12. A method of classifying particulate matter with a dynamic centrifugal gas classifier, the method comprising the steps of:
    introducing a gas-entrained particulate material substantially tangentially into an annular-shaped inner passage so as to impart a centrifugal force to the particulate material while introducing a gas into an annular-shaped outer passage that circumscribes at least a portion of the inner passage;
    separating finer and coarser fractions of the particulate material by passing the gas flowing in the outer passage through at least a portion of the particulate material;
    returning the finer fraction to the inner passage;
    removing the coarser fraction from the dynamic centrifugal gas classifier through a vertical outlet;
    removing the finer fraction from the inner passage through a horizontal outlet that is surrounded by the inner passage; and
    applying additional centrifugal force to the finer fraction within the inner passage with a rotating means having a horizontal axis of rotation and rotating within the horizontal outlet so as to prevent an intermediate fraction of the particulate material from entering the horizontal outlet.

13. A method according to claim 12, further comprising the step of introducing a gas into the vertical outlet to prevent the finer fraction from passing through the vertical outlet while allowing the coarser fraction to continue through the vertical outlet.

14. A method according to claim 12, wherein the particulate material and the gas are introduced into the inner passage through first and second inlets, respectively, that are separated by a baffle.

15. A method according to claim 12, wherein the particulate material is introduced into the inner passage by flowing through an inlet passage in a first direction and then entering the inner passage while flowing in a second direction that is substantially opposite the first direction.

16. A method according to claim 12, wherein the finer fraction flows through the inner passage in a spiraling manner toward the horizontal outlet.

17. A method according to claim 12, wherein the rotating means comprises a wheel with a plurality of vanes at a periphery thereof, the wheel and the vanes operating to propel the intermediate fraction away from the horizontal outlet.

18. A method according to claim 12, wherein the rotating means operates to prevent particles with a size of greater than fifteen micrometers from entering the horizontal outlet.

19. A method according to claim 12, further comprising the step of classifying the finer fraction with a cyclone.

20. A method according to claim 12, wherein the separating step passes the gas through a portion of the particulate material that has been ejected by the centrifugal force from the inner passage toward the outer passage.

21. A method according to claim 12, wherein the step of returning the finer fraction to the inner passage uses the gas that has flowed through the portion of the particulate material to carry the finer fraction toward the inner passage.

22. A dynamic centrifugal gas classifier comprising:

a housing;

internal baffling within the housing that defines an annular-shaped inner passage having a horizontal axis and an annular-shaped outer passage circumscribing the inner passage;

an inlet passage configured for introducing a gas-entrained particulate material substantially tangentially into the housing, the inlet passage having an arcuate shape so that the particulate material flows through a portion of the inlet passage in a first direction and enters the housing while flowing in a second direction that is substantially opposite the first direction;

an inlet baffle within the inlet passage that divides a portion of the inlet passage to define a first inlet into the inner passage for the particulate material and a second inlet into the outer passage for the gas;

a vertical outlet beneath the housing and in communication with the inner and outer passages;

means for separating finer and coarser fractions of the particulate material, the separating means comprising an opening in the internal baffling, the opening being configured to direct the gas flowing in the outer passage through the particulate material flowing in the inner passage, the separating means further comprising a gas inlet to the vertical outlet, the gas inlet being configured to flow a gas into the vertical outlet to direct the finer fraction to the inner passage and prevent the finer fraction from continuing through the vertical outlet while allowing the coarser fraction to continue through the vertical outlet;

a horizontal outlet for removing the finer fraction from the inner passage, the horizontal outlet comprising an axial passage circumscribed by the inner passage, a pair of orifices at opposite axial ends of the axial passage, and a pair of oppositely-disposed horizontal passages oriented substantially parallel to the horizontal axis of the inner passage; and a horizontal rotating wheel disposed in the axial passage and having an axis of rotation coinciding with the horizontal axis of the inner passage, the wheel comprising a plurality of vanes at a periphery thereof, the wheel and the vanes being configured to propel an intermediate fraction of the particulate material away from the horizontal outlet.

* * * * *